United States Patent [19]

Weber et al.

[11] 4,230,594
[45] Oct. 28, 1980

[54] METHOD OF TREATING SPENT REDUCING GAS

[75] Inventors: Heinrich Weber; Kurt Tippmer, both of Recklinghausen, Fed. Rep. of Germany

[73] Assignee: Firma Carl Still, Fed. Rep. of Germany

[21] Appl. No.: 922,311

[22] Filed: Jul. 6, 1978

[30] Foreign Application Priority Data

Jul. 16, 1977 [DE] Fed. Rep. of Germany ....... 2727107

[51] Int. Cl.² ............................ C10K 3/06; C22B 5/00
[52] U.S. Cl. ..................................... 252/188; 44/1 AS; 48/210; 48/213; 48/214 R; 75/6; 75/34; 75/41; 75/91; 252/373
[58] Field of Search ...................... 252/188, 373; 75/6, 75/34, 35, 41, 91; 44/1 SR, 54; 48/210, 213, 214 R

[56] References Cited

U.S. PATENT DOCUMENTS

| | | | |
|---|---|---|---|
| 3,765,872 | 10/1973 | Celada et al. | 75/34 |
| 3,767,379 | 10/1973 | Marion | 75/91 |
| 3,907,703 | 9/1975 | Marion | 252/373 |
| 3,909,446 | 9/1975 | Miyashita et al. | 252/188 |

Primary Examiner—Benjamin R. Padgett
Assistant Examiner—Irwin Gluck
Attorney, Agent, or Firm—McGlew and Tuttle

[57] ABSTRACT

A method of producing reducing gases from oxide ores, particularly iron ores, which contain mainly carbon monoxide and hydrogen and which are employed in the reduction process with a two to three fold excess with regard to the stoichiometric requirement of the ore to be reduced, comprising, mixing a hot moist fresh reducing gas and a preheated recycled gas, both of which are used in reducing iron ores and mainly contain carbon monoxide and hydrogen, directing the mixed gases in counterflow heat exchange with iron sponge in a desulfurizer to treat the sponge, thereafter, directing the treated sponge into an oxidizer and circulating preheated air thereover to lightly oxidize the iron sponge, and subsequently, directing the lightly oxidized iron sponge into a reducing shaft along with the mixed gases which are taken out of the desulfurizer.

9 Claims, 1 Drawing Figure

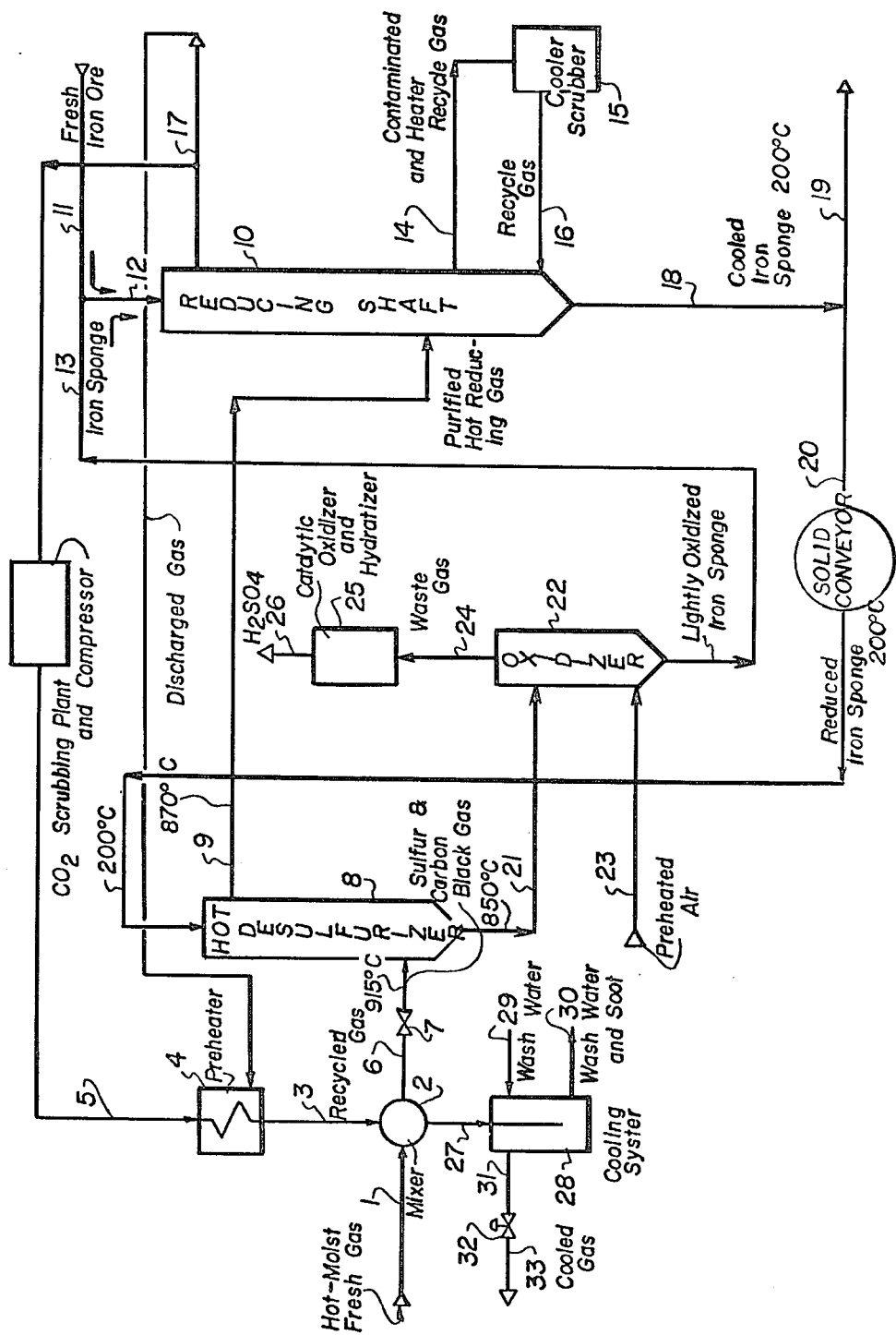

METHOD OF TREATING SPENT REDUCING GAS

FIELD AND BACKGROUND OF THE INVENTION

This invention concerns a method for the production of reducing gases from oxide ores, particularly iron ores, which mainly contain carbon monoxide and hydrogen, in combination with hot gas desulfurization and removal of portions of unreacted carbon from the hot gases.

DESCRIPTION OF THE PRIOR ART

In the method invented by M. Wiberg, (see J. Stahlhed, Stahl u. Eisen, 72-1952, 459/466), the gas is circulated. The $CO_2$ and $H_2O$ formed in the reduction of the ore are reacted again with coke to CO and $H_2$ in an electrically heated gasifier. The hydrogen sulfide formed in the coke gasification is removed with dolomite in a hot desulfurization plant at from 945° C. to 1100° C. The disadvantages of this single heat method in combination with hot desulfurization are that only about 5% sulfur can be combined with the dolomite used in a great excess, and calcium sulfide is not recovered from the large quantities of dolomite waste, and must be stored as solid waste in the form of a depot.

It is also known to remove the sulfurous portions of the reducing gas, which are present in the form of $H_2S$ and COS, at 40° C. to 100° C. in a two-heat system. In this method, see K. Tippner, Erdoel u. Kohle, Volume 29, No. 4, April, 1976, the excess reducing gas is likewise circulated and mixed with fresh gas after it has been liberated in a scrubbing system of dust, $H_2S$ and $CO_2$. The fresh gas is produced from heavy oils and coal according to the method of partial autothermic oxidation at a temperature of from 1300° C. to 1500° C. and the gas is liberated of the sulfurous components at temperatures of from between 40° C. to 100° C. The reducing gas as a mixture of fresh and circulating gas is then heated again indirectly to a temperature of between 800° C. to 900° C. The disadvantage of this method is that the fresh gas is cooled from about 1300° C. to 1500° C. and is desulfurized at this temperature, and reheated again to the desired temperature of the reduction process of 800° C. to 900° C.

SUMMARY OF THE INVENTION

The problem underlying the invention is to provide a new method for the production of reducing gases, which is more economical and less pollutant than the presently known methods, but still satisfying all of the required reaction parameters for the reduction process, like constant quality, degree of oxidation, variable inlet temperature, high purity of sulfur, variable portions of steam and carbon dioxide, absence of solids, and permitting the use of heavy oils, residual oils and coal.

For a method of the above defined type, for the solution of the problem, it is suggested to replace the spent gas discharged from the reducing gas cycle by a hot unpurified fresh gas current.

The method for the production of reducing gases from oxide ores, particularly iron ores which contain mainly carbon monoxide and hydrogen and which are used in a two- to three-fold excess with regard to the stoichiometric requirement of the ore to be reduced, comprises, circulating a main portion of the spent gas used for reducing the iron ore in an indirectly heated preheater after cooling from a range of 400° C. to 500° C. to a range of 70° C. to 40° C., dust removal, compression to 6 to 12 bar, and washing out carbon monoxide to 2 to 10% by volume from the reducing gas production process and, after preheating to a temperature of 200° C. to 500° C. The excess gas that is, other than the aforementioned main portion, is removed from the circuit and used for heating. An amount of carbon monoxide and hydrogen equivalent to the amount of gas used up and discharged is produced as unpurified fresh gas, according to the method of autothermic oxidation from heavy oils or coal, and fed into the circuit without cooling with a temperature of 1400° C. to 1600° C. The crude hot reducing gas, as a mixture of the two gases with a temperature of 900° C., to 1200° C., is treated in a hot desulfurizer in counterflow with reduced circulating iron sponge heated from a range of 200° C. to 300° C. to a range of 800° C. to 900° C.

Due to the given reaction conditions, the iron sponge absorbs the sulfur from the hydrogen sulfide and the carbonyl sulfide. Furthermore, a part of the unreacted carbon is converted to carbon monoxide and hydrogen by catalytic action of the iron sponge and the presence of steam. The hot purified reducing gas with 800° C. to 1000° C. can be used directly in the reduction process, that is, without further heating.

The hot iron sponge with from 5% to 20% by weight of sulfur, and minor portions of unreacted carbon is treated oxidatively in another stage by the addition of oxygen, in the form of air, for example, and a waste gas with portions of $SO_2$ and $SO_3$, as well as portions of $CO_2$ is formed from the carbon, which can be processed in another stage to sulfuric acid or sulfur. The regenerated iron sponge is easily oxidized and is admixed to the fresh unreduced iron ore current.

The advantages of the method, according to the invention, are that the combustion heat of the partial autothermic oxidation is maintained. This is due to the single-heat gasification system for the fresh gas, and becaude iron sponge, which is an intrinsic product of the process, is circulated as a desulfurizing agent so that no waste products are formed. It is also due to the fact that the waste gases of the oxidative treatment of the sulfurous iron sponge, obtained in a form which makes it possible to obtain non-polluting products, such as sulfuric acid or sulfur, and the unreacted carbon of the gasification is removed simultaneously in the hot desulfurization system and can be converted to carbon monoxide, hydrogen and carbon dioxide.

Accordingly, it is an object of the invention to provide a hot desulfurizing method for liberating sulfurous portions from reducing gases which includes substantially carbon monoxide and sulfurous portions such as $H_2S$ and COS, and hydrogen, comprising, directing reduced iron sponge in counterflow heat exchange with a mixed recycled gas and a fresh gas having a sulfur and carbon black content at temperatures of from 700° C. to 1200° C. for desulfurization while, at the same time, removing the portions of unreacted carbon from the partial autothermic oxidation of heavy oils and coal.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawing is a schematic representation of the process of the invention.

DESCRIPTION OF THE PREFERRED EMBODIMENT

Referring to the drawing in particular, the invention embodied therein, comprises, a method for the production of reduction gases according to a single heat system based on the partial autothermic oxidation of heavy oils and coal in combination with hot gas desulfurization and the removal of portions of unreacted carbon from the hot gases. In the FIGURE of the drawing, by way of example, the following is carried out:

33,940 Nm$^3$/h hot and moist fresh gas, taken from an autothermic partial oxidation of heavy oils, but also coal, are fed with a temperature of 1600° C. through pipe 1 to mixer 2. The fresh gas consists of 48.20% by volume CO, 41.70% by volume H$_2$, 3.00 by volume CO$_2$, 6.00% by volume H$_2$O, 0.10% by volume CH$_4$, 0.76% by volume H$_2$S, 0.02% by volume COS and 0.22% by volume Ar+N$_2$.

The gas also contains 170 kg/h carbon black and 1.5 kg/h heavy metals, such as, nickel and vanadium, in the form of sulfides. In addition, 36,750 Nm$^3$/h of recycled gas with 89.0% by volume CO and H$_2$, 3.7% vol. CO$_2$, 0.4% by volume CH$_4$, N$_2$ and Ar, as well as 6.9% by volume H$_2$S is fed to mixer 2 through pipe line 3. The recycled gas is taken from the line 5 of a CO$_2$-recycle gas scrubber and preheated in preheater 4 to 305° C. indirectly by the combustion of discharge gas taken from line 17.

70,690 Nm$^3$/h sulfur-and carbon black-containing reducing gas leave a gas mixer 2 through line 6 and starting slide valve 7 to flow to hot desulfurizer 8 with a gas temperature of 915° C. Over the solid conveyor system 20 are fed to the hot desulfurizer 8600 kg/h reduced iron sponge with a temperature of 200° C. The iron sponge contains 96% by weight Fe, of which 95% are free reactive Fe. The balance is ballast and oxygen.

In the hot desulfurizer 8, the iron sponge is heated in counterflow with the crude reducing gas to 850° C. The temperature and the high inner active reaction surface have the effect that the Fe of the iron sponge dehydrates the H$_2$S contained in the gas to H$_2$S to FeS and H$_2$. This absorption is accompanied by hot hydrolysis of COS with H$_2$O to H$_2$S and CO$_2$, which is then likewise combined as FeS. The steam portion of 6.5% by volume and the temperature of 850° C., as well as the catalytic action of the reduced iron sponge have the effect that the carbon black is partly converted to the gaseous products carbon monoxide and hydrogen, according to the equation $C + H_2O = CO + H_2$. 71,000 Nm$^3$/h purified reducing gas of 870° C. leave the hot desulfurizer 8 through line 9 are, and conducted to, reducing shaft 10. The purified reducing gas still contains 100 ppm (v) sulfur, as well as traces of carbon black.

Reducing shaft 10 is filled through pipe 12 with a mixture of fresh iron ore from line 11 and oxidized iron sponge from line 13. The purified and hot reducing gas flows in counterflow and heats and reduces the iron oxide to iron sponge of 850° C. The hot iron sponge is cooled with a recycle gas current from line 16 to 200° C. The contaminated and heated recycle gas is taken from reducing shaft 10 through line 14 and cooled and cleaned in the cooler-scrubber system 15. The cooled iron sponge leaves the reducing shaft through line 18 and is conducted through line 19 for further processing.

The above-mentioned 8600 kg/h iron sponge are taken from a solid conveyor system 20 and fed to the hot desulfurizer 8. The iron sponge laden with 380 kg/h sulfur, which contains in addition 1.4 kg/h heavy metals and small amounts of unreacted carbon black, is taken from hot desulfurizer 8 through through line 21 and transported to oxidizer 22. By adding partly preheated air through line 23, the FeS is oxidized to Fe$_2$O$_3$ and SO$_2$, as well as traces of SO$_3$. The lightly oxidized iron sponge is returned through line 13 into the reduction process.

A rate of 3355 Nm$^3$/h waste gas, including an amount of SO$_2$ and SO$_3$ of 267 Nm$^3$/h, leaves oxidizer 22 through line 24. The amount of oxygen required for the oxidation is conducted as air in an amount of 3355 Nm$^3$/h through line 23 to oxidizer 22. In the catalytic oxidation stage 25, SO$_2$ is oxidized to SO$_3$ and hydrated with H$_2$O, so that 1140 kg/h H$_2$SO$_4$ can be withdrawn from the system through line 26.

In order to start the process, an inert gas, for example, N$_2$, is fed to mixer 2 through line 3. In this case, starting slide valve 7 is closed and the cooled fresh gas produced is fed through line 27 to cooling system 28. The cooled gas leaves the system through line 31, pressure-keeping valve 32 and line 33. The cooling is effected directly with recycle water from line 29. The carbon-laden wash water leaves the starting system through line 30.

While a specific embodiment of the invention has been shown and described in detail to illustrate the application of the principles of the invention, it will be understood that the invention may be embodied otherwise without departing from such principles.

What is claimed is:

1. A method of treating spent reducing gas which was spent in reducing iron ore comprising the steps of mixing the spent reducing gas with a fresh gas to replenish carbon monoxide and hydrogen and form a mixed gas of the type having substantially carbon monoxide, hydrogen sulfide and carbonyl sulfide, and directing an iron sponge in a counterflow heat transfer contact with said mixed gas at temperatures ranging from 700° C. to 1200° C. to partly desulfurize said mixed gas and to remove unreacted carbon from said mixed gas.

2. The method according to claim 1, further comprising, before said mixing step, the steps of first treating the spent gas by cooling the spent gas to within a temperature range of 70° C. to 40° C., dedusting the spent gas, compressing the spent gas to a pressure of 6 to 12 bar, and washing carbon monoxide out of the spent gas to 2 to 10 percent by volume; and then preheating the treated spent gas to a temperature range of 200° C. to 500° C.

3. The method according to claim 1, further comprising subjecting the spent gas to indirect heat transfer to change the temperature to within a temperature range of 200° C. to 500° C.

4. The method according to claim 1, wherein said fresh gas comprises unpurified gases produced by the autothermic oxidation of heavy oils or coal.

5. The method according to claim 1, further comprising subsequently oxidizing said iron sponge at 700° C. to 1200° C. with one of preheated air and oxygen-enriched air.

6. The method according to claim 1, further comprising subsequently oxidizing said iron sponge at 700° C. to 1200° C. with preheated oxygen-enriched air.

7. The method according to claim 1, wherein said iron sponge include 5 to 10 percent by weight sulfur.

8. The method according to claim 1, wherein iron sponge and mixed gas are contacted in a reducing atmosphere having 5 to 10 percent by volume steam.

9. A method of treating spent reducing gas which was spent in reducing iron ore comprising the steps of first treating the spent reducing gas by cooling the gas to a temperature range of 70° C. to 40° C., dedusting the gas, compressing the gas to a pressure to 6 to 12 bar, and washing carbon monoxide out of the gas to an amount of 2 to 10 percent by volume; then preheating the gas to temperature range of 200° C. to 500° C.; mixing the preheated gas with a fresh gas having a temperature of 1400° C. to 1600° C. for replenshing carbon monoxide and hydrogen to form a mixed gas of the type having substantially carbon monoxide, hydrogen sulfide and carbonyl sulfide with a temperature of 900° C. to 1200° C., and directing iron sponge with a temperature of 200° C. to 300° C. in a counterflow direct heat transfer with said mixed gas to partly desulfurize said mixed gas and to remove unreacted carbon from said mixed gas.

* * * * *